(12) United States Patent
Subrahmanyam et al.

(10) Patent No.: US 7,180,703 B1
(45) Date of Patent: Feb. 20, 2007

(54) DISK DRIVE COMPRISING A SPINDLE MOTOR EMPLOYING ANIONIC/CATIONIC LUBRICANT TO REDUCE DISK SURFACE POTENTIAL

(75) Inventors: Jai N. Subrahmanyam, San Diego, CA (US); Jack M. Chue, Los Altos, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 437 days.

(21) Appl. No.: 10/845,863

(22) Filed: May 15, 2004

(51) Int. Cl.
*G11B 33/14* (2006.01)

(52) U.S. Cl. .............................. 360/97.02; 360/98.07; 360/99.08

(58) Field of Classification Search ...................... None
See application file for complete search history.

(56) References Cited

U.S. PATENT DOCUMENTS

| | | | |
|---|---|---|---|
| 4,885,104 A | 12/1989 | Sturwold | |
| 5,214,326 A | 5/1993 | Yonei | |
| 5,559,651 A | 9/1996 | Grantz et al. | |
| 5,661,353 A | 8/1997 | Erdman et al. | |
| 5,729,404 A | 3/1998 | Dunfield et al. | |
| 5,844,748 A | 12/1998 | Dunfield et al. | |
| 6,148,501 A | 11/2000 | Grantz et al. | |
| 6,151,189 A | 11/2000 | Brooks | |
| 6,181,039 B1 | 1/2001 | Kennedy et al. | |
| 6,211,584 B1 * | 4/2001 | Kurosawa et al. | 310/45 |
| 6,322,252 B1 | 11/2001 | Grantz et al. | |
| 6,490,137 B1 * | 12/2002 | Toyota et al. | 360/265.2 |
| 6,669,369 B1 | 12/2003 | Nottingham et al. | |
| 6,678,115 B2 | 1/2004 | Khan | |
| 2003/0053250 A1 * | 3/2003 | Ishikawa et al. | 360/99.08 |

* cited by examiner

*Primary Examiner*—A. J. Heinz
(74) *Attorney, Agent, or Firm*—Howard H. Sheerin, Esq.

(57) ABSTRACT

A disk drive is disclosed comprising a disk, a head actuated over the disk, and a spindle motor for rotating the disk. The spindle motor comprises a rotating component, a stationary component, and a first and second bearing assembly disposed between the rotating component and stationary component for rotating the rotating component about the stationary component, wherein the disk is attached to the rotating component. The bearing assemblies comprise a stationary component surface and a rotating component surface having a lubricant disposed there between. The first bearing assembly employs an anionic lubricant such that a first voltage forms between the stationary component surface and the rotating component surface when the rotating component rotates about the stationary component. The second bearing assembly employs a cationic lubricant such that a second voltage forms between the stationary component surface and the rotating component surface when the rotating component rotates about the stationary component. A polarity of the second voltage being opposite a polarity of the first voltage to thereby reduce the potential at the disk surface.

18 Claims, 6 Drawing Sheets

DISK DRIVE COMPRISING A SPINDLE MOTOR EMPLOYING ANIONIC/CATIONIC LUBRICANT TO REDUCE DISK SURFACE POTENTIAL

BACKGROUND OF THE INVENTION

1. Field of the Invention

The present invention relates to disk drives for computer systems. More particularly, the present invention relates to a disk drive comprising a spindle motor employing anionic/cationic lubricant to reduce disk surface potential.

2. Description of the Prior Art

Disk drives employ a spindle motor for rotating a disk while a head writes data to and reads data from the disk. The spindle motor comprises a plurality of permanent magnets and a plurality of windings. When the windings are energized with current according to a commutation sequence the resulting magnetic flux interacts with the magnetic flux of the permanent magnets to rotate a rotating component about a stationary component. Because the disk is attached to the rotating component, any voltage that builds between the rotating component and the stationary component raises the potential at the surface of the disk which can damage the head, particularly magnetoresistive (MR) heads.

A low resistance material (e.g., steel) can be used for the bearings disposed between the rotating component and stationary component in order to reduce the potential at the disk surface. However, bearings made of a high resistance material (e.g., ceramic) provide several performance enhancing benefits. For example, ceramic bearings typically exhibit high axial and radial stiffness, a smooth surface, and are more spherical which reduces disk runout as well as acoustic noise. In addition, less lubricating grease is required due to the smooth surface of ceramic bearings which reduces friction thereby improving power efficiency.

Another known technique for reducing the potential at the disk surface is a ferro-fluidic seal which provides a low resistance electrical path between the rotating component and stationary component of the spindle motor. However, the complexity and component count of ferro-fluidic seals increase the cost of the spindle motor as well as the likelihood of failures due to defects.

There is, therefore, a need for a simple, less expensive technique for reducing the potential at the disk surface in a disk drive in order to protect the head.

SUMMARY OF THE INVENTION

The present invention may be regarded as a disk drive comprising a disk, a head actuated over the disk, and a spindle motor for rotating the disk. The spindle motor comprises a rotating component, a stationary component, and a first and second bearing assembly disposed between the rotating component and stationary component for rotating the rotating component about the stationary component, wherein the disk is attached to the rotating component. The first bearing assembly comprises a first stationary component surface and a first rotating component surface, and an anionic lubricant is disposed between the first stationary component surface and the first rotating component surface such that a first voltage forms between the first stationary component surface and the first rotating component surface when the rotating component rotates about the stationary component. The second bearing assembly comprises a second stationary component surface and a second rotating component surface, and a cationic lubricant is disposed between the second stationary component surface and the second rotating component surface such that a second voltage forms between the second stationary component surface and the second rotating component surface when the rotating component rotates about the stationary component, wherein a polarity of the second voltage being opposite a polarity of the first voltage to thereby reduce the potential at the disk surface.

In one embodiment, the first stationary component surface comprises a first inner race and the first rotating component surface comprises a first outer race, wherein a first plurality of ball bearings are disposed between the first inner race and the first outer race and the anionic lubricant comprises an anionic grease coating the first plurality of ball bearings. The second stationary component surface comprises a second inner race and the second rotating component surface comprises a second outer race, wherein a second plurality of ball bearings are disposed between the second inner race and the second outer race and the cationic lubricant comprises a cationic grease coating the second plurality of ball bearings. In one embodiment, the ball bearings comprise steel, and in another embodiment the ball bearings comprise ceramic.

In one embodiment, the spindle motor stationary component comprises a shaft having the first and second stationary component surfaces. In one embodiment, the first bearing assembly is attached proximate a top of the shaft, and the second bearing assembly is attached proximate a bottom of the shaft.

In another embodiment, the first bearing assembly comprises a fluid bearing assembly and the second bearing assembly comprises a fluid bearing assembly.

In yet another embodiment, the anionic lubricant comprises a base lubricant and an anionic additive and the cationic lubricant comprises the base lubricant and a cationic additive. In one embodiment, the ratio of anionic additive to cationic additive is non-unity.

The present invention may also be regarded as a spindle motor for rotating a disk in a disk drive, the disk drive comprising the disk and a head actuated over the disk. The spindle motor comprises a rotating component, a stationary component, and a first and second bearing assembly disposed between the rotating component and stationary component for rotating the rotating component about the stationary component. The rotating component for attaching to the disk. The first bearing assembly comprises a first stationary component surface and a first rotating component surface. An anionic lubricant is disposed between the first stationary component surface and the first rotating component surface such that a first voltage forms between the first stationary component surface and the first rotating component surface when the rotating component rotates about the stationary component. The second bearing assembly comprises a second stationary component surface and a second rotating component surface. A cationic lubricant is disposed between the second stationary component surface and the second rotating component surface such that a second voltage forms between the second stationary component surface and the second rotating component surface when the rotating component rotates about the stationary component. A polarity of the second voltage being opposite a polarity of the first voltage to thereby reduce the potential at the disk surface.

DESCRIPTION OF THE PREFERRED EMBODIMENTS

Figure 1:
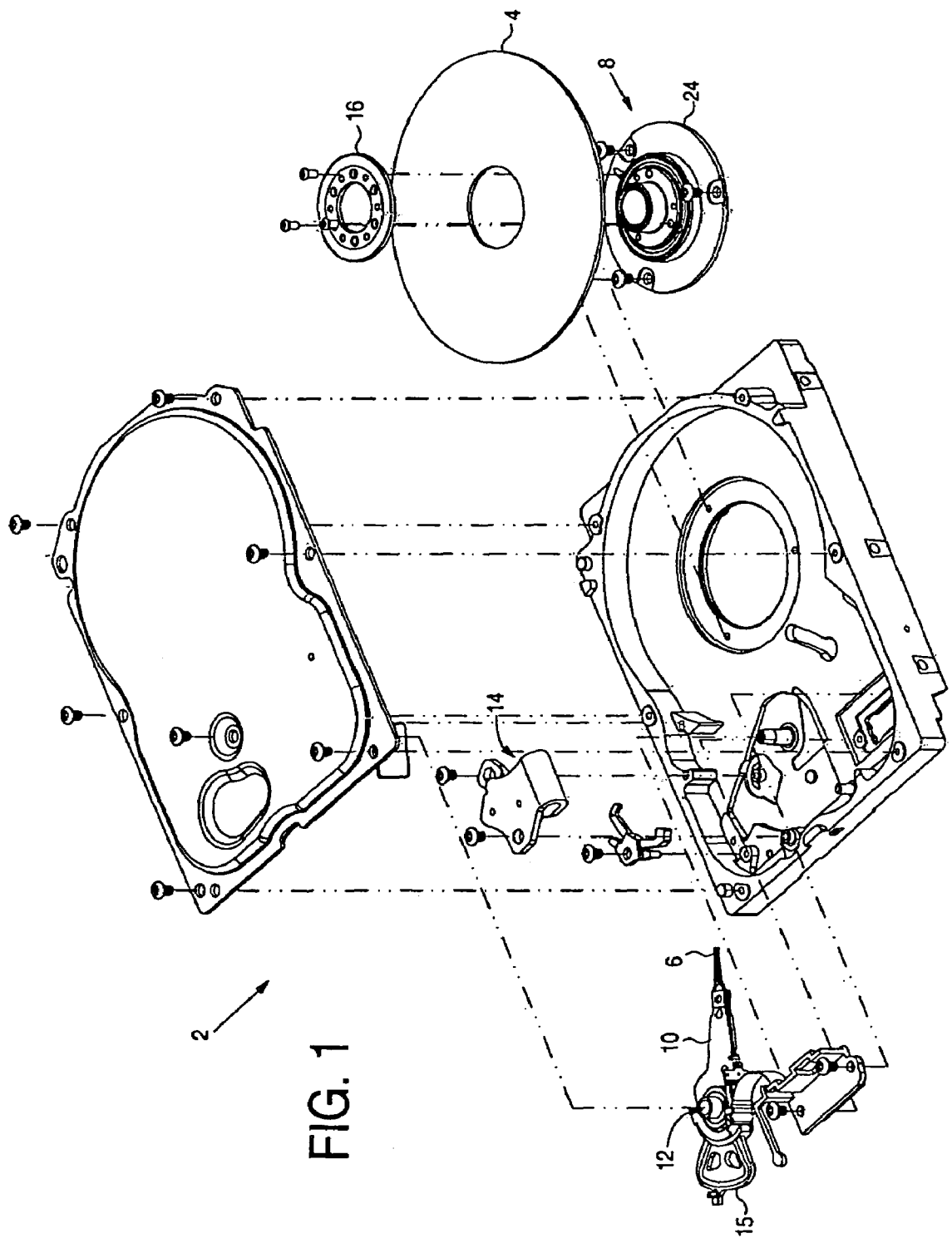
FIG. 1 shows an exploded view of a disk drive according to an embodiment of the present invention including a disk rotated by a spindle motor and a head actuated over the disk.

FIG. 1 shows an exploded view of a disk drive 2 according to an embodiment of the present invention comprising a disk 4, a head 6 actuated over a surface of the disk 4, and a spindle motor 8 for rotating the disk 4. The spindle motor 8 comprises a rotating component, a stationary component, and a first and second bearing assembly disposed between the rotating component and stationary component for rotating the rotating component about the stationary component, wherein the disk is attached to the rotating component. The first bearing assembly comprises a first stationary component surface and a first rotating component surface, and an anionic lubricant is disposed between the first stationary component surface and the first rotating component surface such that a first voltage forms between the first stationary component surface and the first rotating component surface when the rotating component rotates about the stationary component. The second bearing assembly comprises a second stationary component surface and a second rotating component surface, and a cationic lubricant is disposed between the second stationary component surface and the second rotating component surface such that a second voltage forms between the second stationary component surface and the second rotating component surface when the rotating component rotates about the stationary component, wherein a polarity of the second voltage being opposite a polarity of the first voltage to thereby reduce the potential at the disk surface.

The head 6 in the disk drive 2 of FIG. 1 is coupled to a distal end of an actuator arm 10 which is rotated about a pivot 12 by a voice coil motor in order to actuate the head 6 radially over the disk 4 while the spindle motor 8 rotates the disk 4 at a predetermined angular velocity. The voice coil motor comprises a yoke 14 having at least one permanent magnet which interact with a magnetic flux emanating from a voice coil 15 attached to a base end of the actuator arm 10. A disk clamp 16 clamps the disk 4 to the spindle motor 8 using a plurality of screws. In one embodiment, the head 6 comprises a magnetoresistive (MR) read element which is more susceptible to damage from potential at the disk surface.

Figure 2:
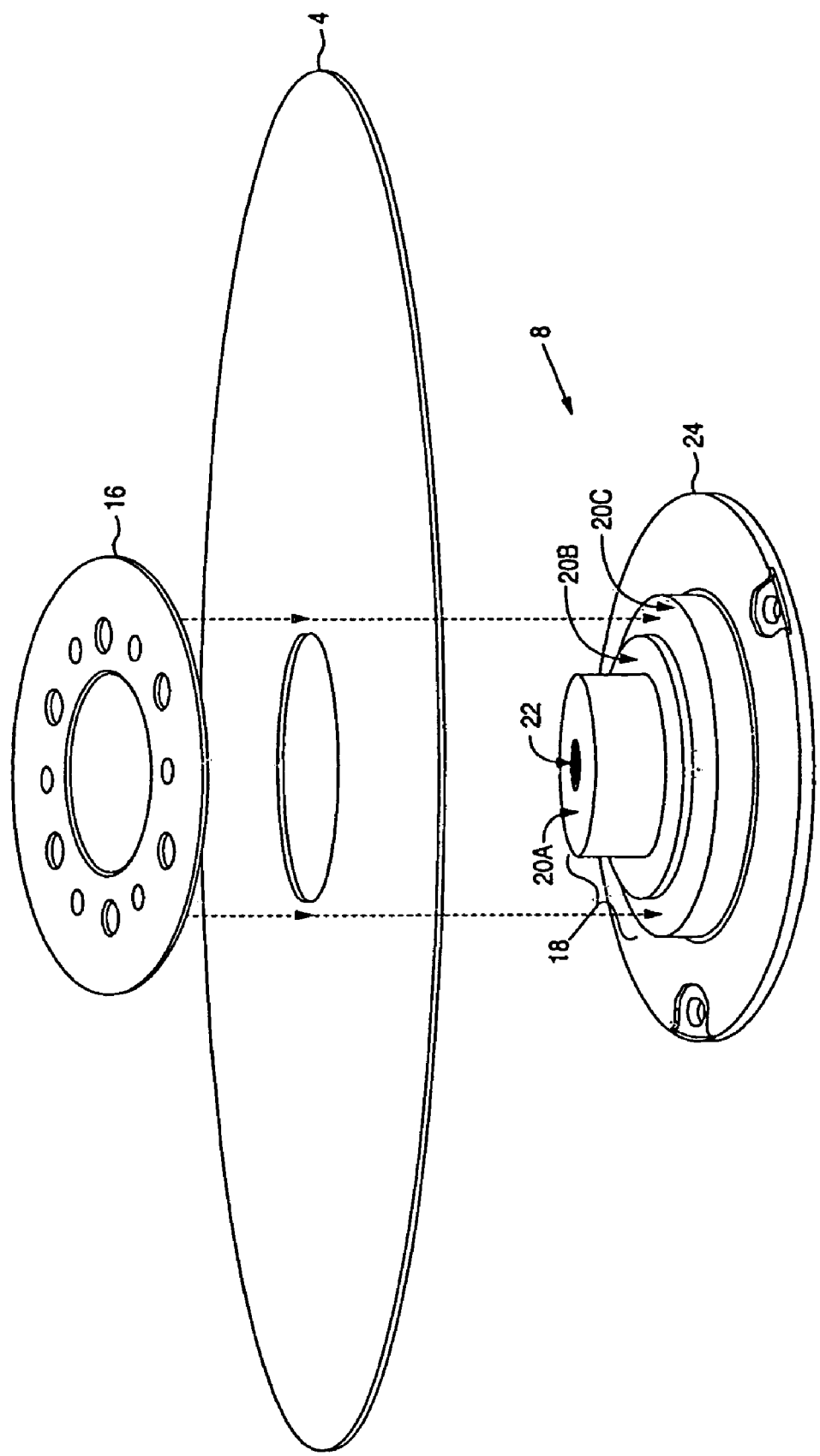
FIG. 2 shows an embodiment of how the disk is clamped to the spindle motor.

FIG. 2 shows an embodiment wherein the rotating component 18 of the spindle motor 8 comprises a multi-tier configuration including ring-shaped surface 20A, ring-shaped surface 20B, and ring-shaped surface 20C. The disk 4 seats on ring-shaped surface 20C with the ring-shaped surface 20B being disposed axially through the aperture in the center of the disk 4. A beveled surface of a disk clamp 16 presses the disk 4 onto the ring-shaped surface 20C, while screws are inserted through apertures of the disk clamp 16 and screwed into the ring-shaped surface 20B thereby clamping the disk 4 to the rotating component 18. During operation the spindle motor 8 rotates the rotating component 18 (and clamped disk 4) about a fixed shaft 22.

Figure 3:
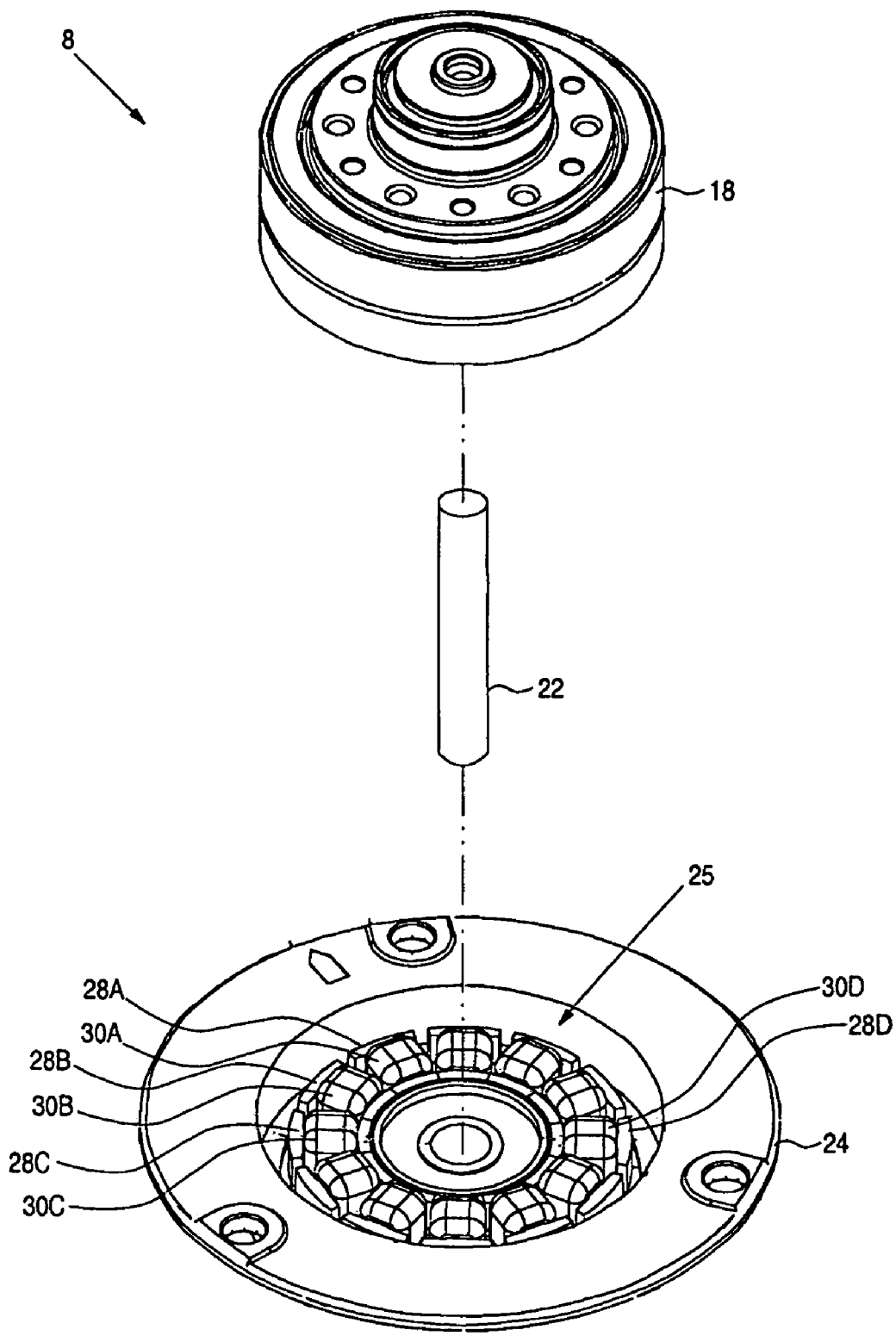
FIG. 3 shows an exploded view of a spindle motor according to an embodiment of the present invention comprising a rotating component and a stationary component including a shaft, a plurality of windings and a plurality of stator teeth.

An exploded view of the spindle motor of FIG. 2 is shown in FIG. 3 wherein the stationary component comprises a base 24, a shaft 22 coupled to the base 24, and a ring-shaped stator 25 having a planar alignment substantially parallel with the disk 4. The shaft 22 is disposed axially through the ring-shaped stator 25. The ring-shaped stator 25 comprises a plurality of stator teeth (e.g., 28A–28D), wherein a winding (e.g., 30A–30D) is wound around each stator tooth. The rotating component 18 comprising a plurality of magnets (e.g., 32A and 32B of FIG. 5) for interacting with the stator teeth (e.g., 28A–28D) to rotate the rotating component 18 about the shaft 22 when the windings are energized.

Figure 4:
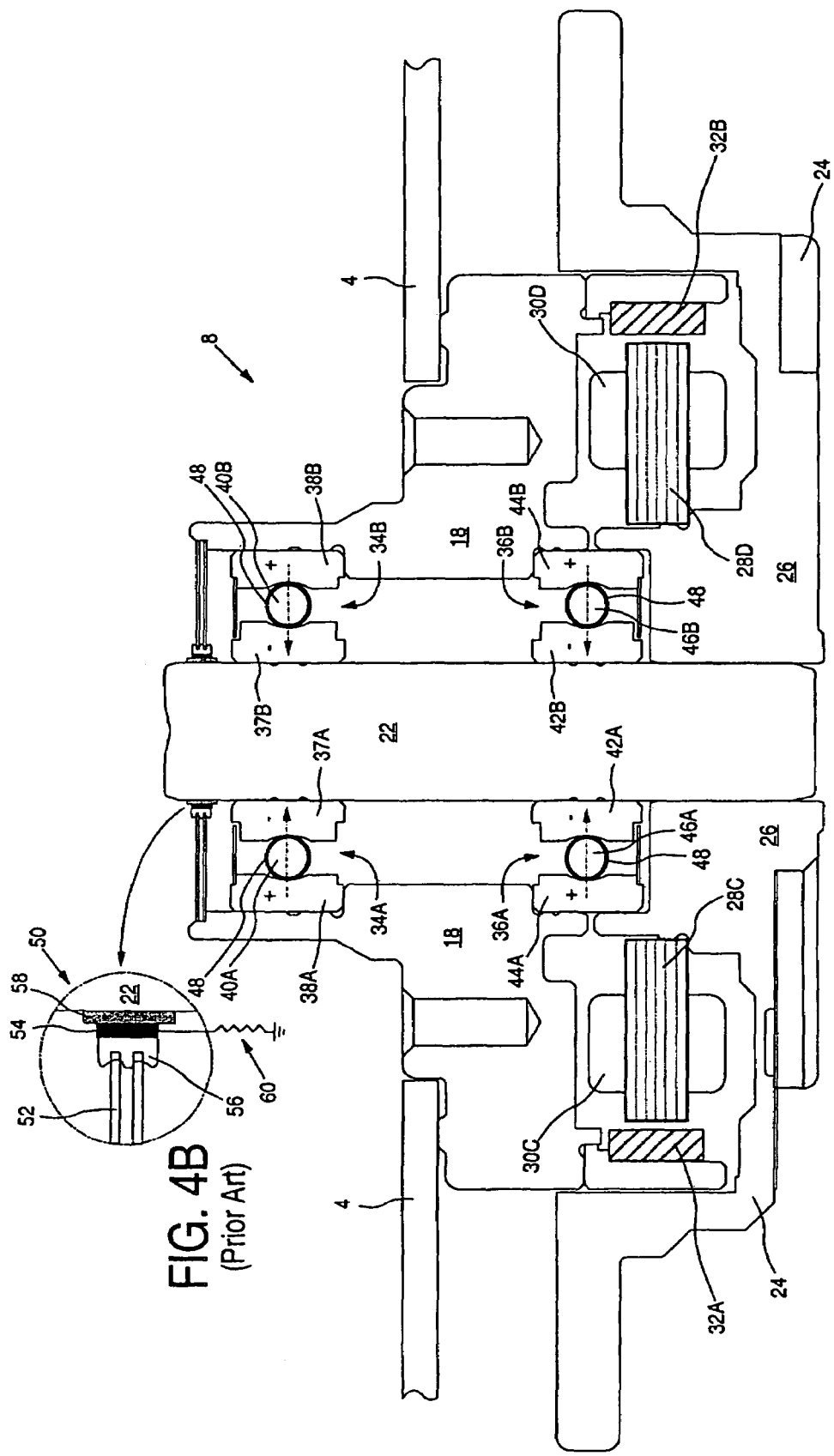
FIG. 4A is a cross-sectional view of a prior art spindle motor comprising a ferro-fluidic seal for providing a low resistance electrical path between the rotating component and stationary component in order to reduce the potential at the disk surface.
FIG. 4B is a magnified view of the ferro-fluidic seal employed in the prior art spindle motor of FIG. 4A.

FIG. 4A shows a cross-sectional view of a prior art spindle motor having structure similar to the spindle motor of FIG. 3. This view shows the spindle motor as comprising an upper bearing assembly (34A and 34B) and a lower bearing assembly (36A and 36B). The upper bearing assembly (34A and 34B) comprises a first inner race (37A and 37B), a first outer race (38A and 38B), and a first plurality of bearings (40A and 40B) disposed between the first inner race (37A and 37B) and first outer race (38A and 38B). The lower bearing assembly (36A and 36B) comprises a second inner race (42A and 42B), a second outer race (44A and 44B), and a second plurality of bearings (46A and 46B) disposed between the second inner race (42A and 42B) and second outer race (44A and 44B). The first plurality of bearings (40A and 40B) and the second plurality of bearings (46A and 46B) are coated with a lubricating grease 48. When the rotating component 18 rotates about the shaft 22, a charge movement occurs due to the bearing movement through the lubricating grease 48. Since the outer race has a larger circumference than the inner race a current flows between the races. Further, since the bearings in the upper and lower bearing assemblies are coated with the same grease 48 which has a particular charge characteristic (e.g., positively or negatively charged), the current flows in the same direction between the races (as shown by the arrows) resulting in a voltage developing between the rotating component 18 and the stationary component 26.

To reduce the voltage between the rotating component 18 and the stationary component 26 (and thereby reduce the potential at the disk surface), the prior art spindle motor of FIG. 4A employs a ferro-fluidic seal 50. FIG. 4B shows a magnified view of the ferro-fluidic seal 50 comprising a sealing ring 52 attached at an outer circumference to the rotating component 18 and extending inward toward the shaft 22. A magnetic ring 54 wraps around the shaft 22, and a ferro-fluid 56 is disposed in the gap between the sealing ring 52 and the magnetic ring 54. An insulator ring 58 insulates the magnetic ring 54 from the shaft 22. A resistor 60 provides an electrical path to ground to reduce the voltage between the rotating component 18 and the stationary component 26.

Figure 5:
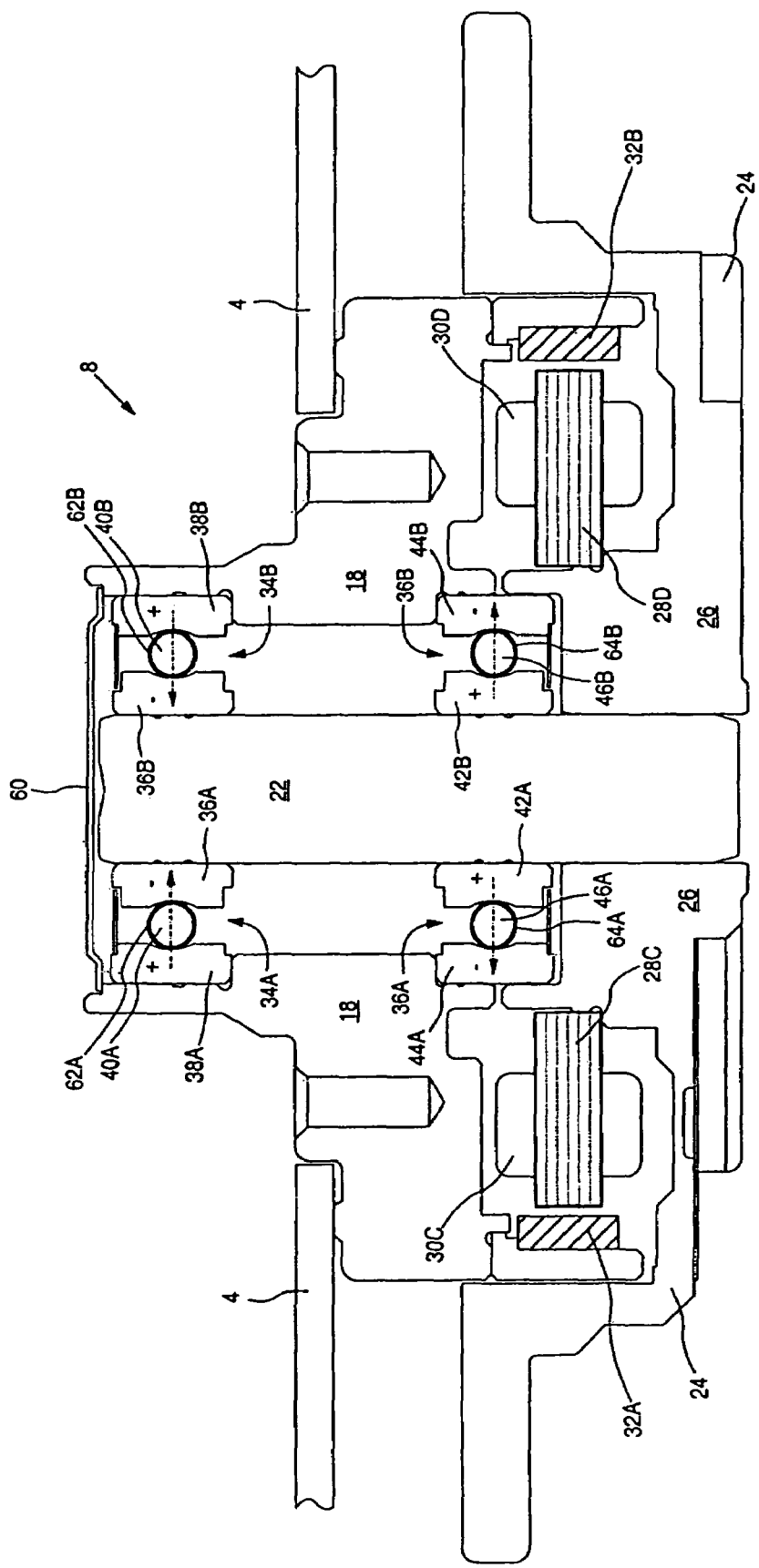
FIG. 5 is a cross-sectional view of a spindle motor according to an embodiment of the present invention wherein a first bearing assembly comprises bearings coated with an anionic grease and a second bearing assembly comprises bearings coated with a cationic grease so that the net voltage between the rotating component and stationary component is reduced.

FIG. 5 shows a cross-sectional view of a spindle motor 8 according to an embodiment of the present invention. The structure of the spindle motor 8 is similar to the prior art spindle motor described above with reference to FIG. 4A except the ferro-fluidic seal 50 has been replaced with less complex, less expensive, single-piece ring-shaped seal 60 which is attached to the rotating component 18. In addition, the lubricating grease 48 of FIG. 4A has been modified such that one of the sets of bearings (e.g., the upper bearings (40A and 40B)) are coated with an anionic grease (62A and 62B) and the other set of bearings (e.g., the lower bearings (46A and 46B)) are coated with a cationic grease (64A and 64B). When the rotating component 18 rotates about the stationary component 26 (i.e., the fixed shaft 22), the anionic grease (62A and 62B) causes current to flow between the inner and outer races of the upper bearing assembly (34A and 34B) in a first direction, and the cationic grease (64A and 64B) causes current to flow between the inner and outer races of the lower bearing assembly (36A and 36B) in an opposite direction as illustrated by the arrows. This reduces the net voltage between the rotating component 18 and the stationary component 26 thereby reducing the potential at the disk surface.

Figure 6:
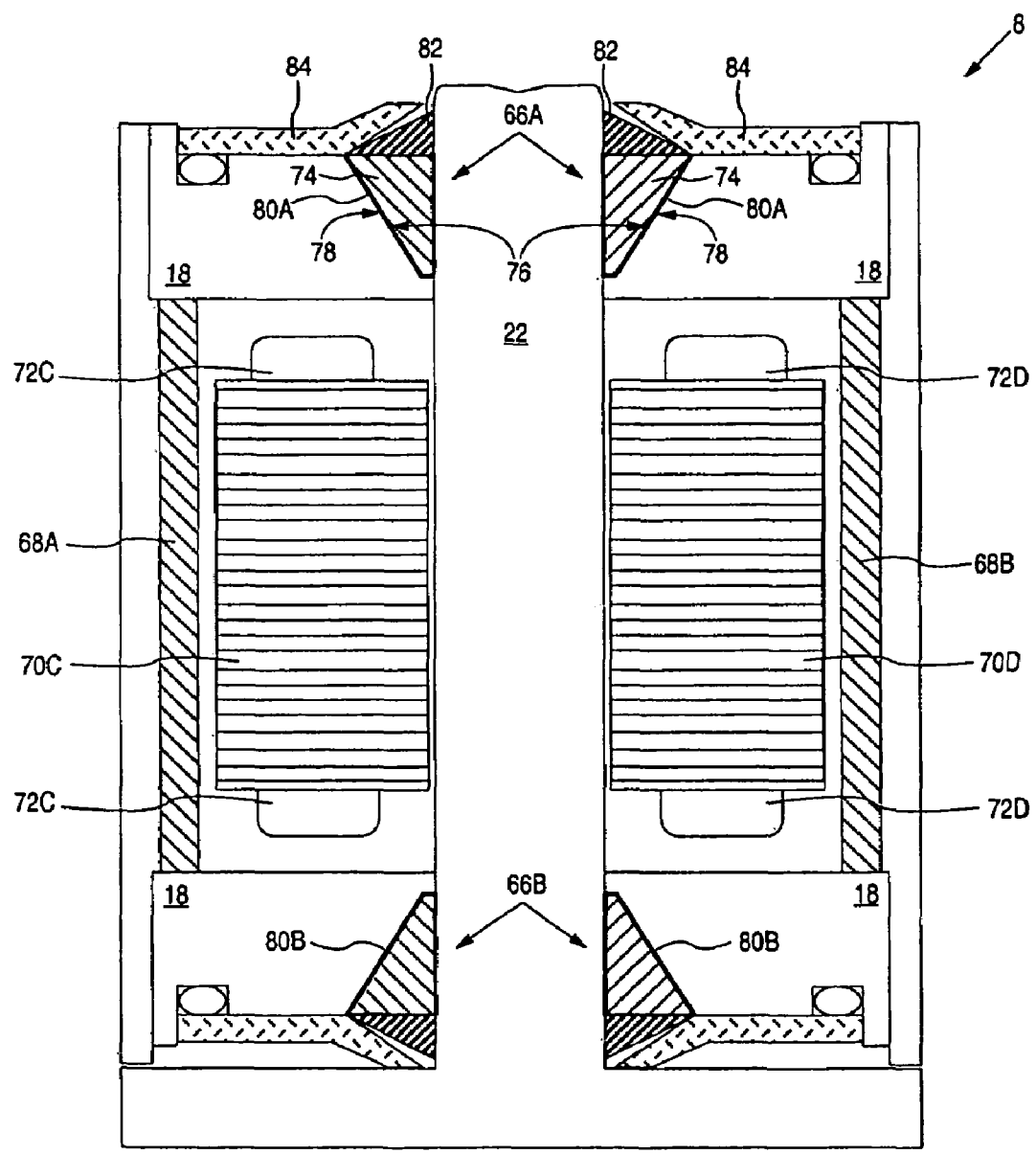
FIG. 6 is a cross-sectional view of a spindle motor according to an alternative embodiment of the present invention employing a first and second fluid bearing assembly.

FIG. 6 shows a cross-sectional view of a bell-shaped spindle motor according to an alternative embodiment of the present invention employing a top fluid bearing assembly 66A and a bottom fluid bearing assembly 66B. The rotating component 18 in this embodiment comprises a substantially cylindrical shape wherein an interior circumferential surface of the rotating component 18 comprises a plurality of magnets (e.g., 68A and 68B). The stator teeth (e.g., 70C and 70D) are attached to the shaft 22 and a winding (e.g., 72C and 72D) is wound around each stator tooth. Referring to the top fluid bearing assembly 66A, a bearing cone 74 is attached to the shaft 22 and forms a stationary component surface 76 opposite a rotating component surface 78. A lubricant 80A is disposed between the stationary component surface 76 and the rotating component surface 78 (e.g., in grooves formed in the bearing cone 74). A seal cone 82 attached to the shaft 22 together with a seal shield 84 attached to the rotating component 18 form a centrifugal capillary seal when the rotating component 18 rotates about the shaft 22. One of the fluid bearing assemblies (e.g., the top fluid bearing assembly 66A) employs an anionic lubricant (e.g., lubricant 80A) and the other fluid bearing assembly (e.g., the bottom fluid bearing assembly 66B) employs a cationic lubricant (e.g., lubricant 80B).

The aspects of the present invention may be applied to any suitable spindle motor that employs at least two sets of bearing assemblies, such as ball bearing assemblies or fluid bearing assemblies. In the embodiments of FIGS. 5 and 6, the rotating component 18 rotates about a fixed shaft 22. In an alternative embodiment, the structure is inverted such that the shaft 22 is part of the rotating component 18.

The anionic and cationic lubricant may comprise any suitable composition. In the embodiment employing ball bearings, the anionic lubricant comprises a base grease (e.g., Multemp grease) with an anionic additive, and the cationic lubricant comprises the base grease with a cationic additive. In the embodiment employing fluid bearings, the anionic lubricant comprises a base fluid (e.g., oil or ferromagnetic fluid) with an anionic additive, and the cationic fluid comprises the base fluid with a cationic additive. Example anionic additives include alkali metal salts of fatty acids, amine and ammonium soaps of fatty acids, alkali metal dialkyl sulfosuccinates, sulfated oils, sulfonated oils, alkali metal alkyl sulfates, and the like. Example cationic additives include cetyl pyridinium bromide, hexadecyl morpholinium chloride, dilauryl triethylene tetramine diacetate, didodecylamine lactate, and the like.

The mobility of the positively charged (anionic) and negatively charged (cationic) lubricant molecules may differ. Therefore, in one embodiment the difference in mobility is compensated by selecting an appropriate ratio of anionic to cationic additive. For example, more anionic additive may be used than cationic additive so that the corresponding current flow (and voltages) will substantially cancel.

We claim:

1. A disk drive comprising:
   (a) a disk;
   (b) a head actuated over the disk; and
   (c) a spindle motor for rotating the disk, the spindle motor comprising a rotating component, a stationary component, a first and second bearing assembly disposed between the rotating component and stationary component for rotating the rotating component about the stationary component, wherein:
   the disk is attached to the rotating component;
   the first bearing assembly comprises a first stationary component surface and a first rotating component surface;
   an anionic lubricant is disposed between the first stationary component surface and the first rotating component surface such that a first voltage forms between the first stationary component surface and the first rotating component surface when the rotating component rotates about the stationary component;
   the second bearing assembly comprises a second stationary component surface and a second rotating component surface;
   a cationic lubricant is disposed between the second stationary component surface and the second rotating component surface such that a second voltage forms between the second stationary component surface and the second rotating component surface when the rotating component rotates about the stationary component; and
   a polarity of the second voltage being opposite a polarity of the first voltage to thereby reduce the potential at the disk surface.

2. The disk drive as recited in claim 1, wherein:
   (a) the first stationary component surface comprises a first inner race and the first rotating component surface comprises a first outer race;
   (b) a first plurality of ball bearings are disposed between the first inner race and the first outer race;
   (c) the anionic lubricant comprises an anionic grease coating the first plurality of ball bearings;
   (d) the second stationary component surface comprises a second inner race and the second rotating component surface comprises a second outer race;
   (e) a second plurality of ball bearings are disposed between the second inner race and the second outer race; and
   (f) the cationic lubricant comprises a cationic grease coating the second plurality of ball bearings.

3. The disk drive as recited in claim 2, wherein the first and second plurality of ball bearings comprise steel.

4. The disk drive as recited in claim 2, wherein the first and second plurality of ball bearings comprise ceramic.

5. The disk drive as recited in claim 1, wherein the spindle motor comprises a shaft having the first and second stationary component surfaces.

6. The disk drive as recited in claim 5, wherein:
(a) the first bearing assembly is attached proximate a top of the shaft; and
(b) the second bearing assembly is attached proximate a bottom of the shaft.

7. The disk drive as recited in claim 1, wherein:
(a) the first bearing assembly comprises a fluid bearing assembly; and
(b) the second bearing assembly comprises a fluid bearing assembly.

8. The disk drive as recited in claim 1, wherein:
(a) the anionic lubricant comprises a base lubricant and an anionic additive; and
(b) the cationic lubricant comprises the base lubricant and a cationic additive.

9. The disk drive as recited in claim 8, wherein the ratio of anionic additive to cationic additive is non-unity.

10. A spindle motor for rotating a disk in a disk drive, the disk drive comprising the disk and a head actuated over the disk; the spindle motor comprising:
(a) a rotating component;
(b) a stationary component; and
(c) a first and second bearing assembly disposed between the rotating component and stationary component for rotating the rotating component about the stationary component, wherein:
the rotating component for attaching to the disk;
the first bearing assembly comprises a first stationary component surface and a first rotating component surface;
an anionic lubricant is disposed between the first stationary component surface and the first rotating component surface such that a first voltage forms between the first stationary component surface and the first rotating component surface when the rotating component rotates about the stationary component;
the second bearing assembly comprises a second stationary component surface and a second rotating component surface;
a cationic lubricant is disposed between the second stationary component surface and the second rotating component surface such that a second voltage forms between the second stationary component surface and the second rotating component surface when the rotating component rotates about the stationary component; and
a polarity of the second voltage being opposite a polarity of the first voltage to thereby reduce the potential at the disk surface.

11. The spindle motor as recited in claim 10, wherein:
(a) the first stationary component surface comprises a first inner race and the first rotating component surface comprises a first outer race;
(b) a first plurality of ball bearings are disposed between the first inner race and the first outer race;
(c) the anionic lubricant comprises an anionic grease coating the first plurality of ball bearings;
(d) the second stationary component surface comprises a second inner race and the second rotating component surface comprises a second outer race;
(e) a second plurality of ball bearings are disposed between the second inner race and the second outer race; and
(f) the cationic lubricant comprises a cationic grease coating the second plurality of ball bearings.

12. The spindle motor as recited in claim 11, wherein the first and second plurality of ball bearings comprise steel.

13. The spindle motor as recited in claim 11, wherein the first and second plurality of ball bearings comprise ceramic.

14. The spindle motor as recited in claim 10, wherein the spindle motor comprises a shaft having the first and second stationary component surfaces.

15. The spindle motor as recited in claim 14, wherein:
(a) the first bearing assembly is attached proximate a top of the shaft; and
(b) the second bearing assembly is attached proximate a bottom of the shaft.

16. The spindle motor as recited in claim 10, wherein:
(a) the first bearing assembly comprises a fluid bearing assembly; and
(b) the second bearing assembly comprises a fluid bearing assembly.

17. The spindle motor as recited in claim 10, wherein:
(a) the anionic lubricant comprises a base lubricant and an anionic additive; and
(b) the cationic lubricant comprises the base lubricant and a cationic additive.

18. The spindle motor as recited in claim 17, wherein the ratio of anionic additive to cationic additive is non-unity.

* * * * *